United States Patent [19]

Gouda et al.

[11] Patent Number: 5,374,682
[45] Date of Patent: Dec. 20, 1994

[54] THERMOSETTING COATING COMPOSITION AND COATED ARTICLE

[75] Inventors: Yoshimichi Gouda, Tokyo; Hiroyuki Ooguri, Anjyo, both of Japan

[73] Assignee: Nippon Paint Co., Ltd., Osaka, Japan

[21] Appl. No.: 148,428

[22] Filed: Nov. 8, 1993

Related U.S. Application Data

[63] Continuation of Ser. No. 813,915, Dec. 27, 1991, abandoned.

[30] Foreign Application Priority Data

Dec. 28, 1990 [JP] Japan .................. 2-416363

[51] Int. Cl.$^5$ .............................. C08L 35/00
[52] U.S. Cl. ................... 525/185; 525/186; 428/500; 428/413; 428/421; 428/423.1; 428/424.2; 428/480; 428/502; 428/504; 428/522
[58] Field of Search ........... 428/500, 413, 421, 423.1, 428/424.2, 480, 502, 504, 522, 185.1, 186

[56] References Cited

U.S. PATENT DOCUMENTS 3,976,718  8/1976  Labana et al. .
4,591,533  5/1986  Antonelli et al. .
5,087,286  2/1992  Fukuda et al. .
5,102,961  4/1992  Blank .................... 525/528

FOREIGN PATENT DOCUMENTS 0316873  5/1989  European Pat. Off. .
0316874  5/1989  European Pat. Off. .
0351966  1/1990  European Pat. Off. .
0353734  2/1990  European Pat. Off. .

*Primary Examiner*—John Kight, III
*Assistant Examiner*—Dvc Truong
*Attorney, Agent, or Firm*—Sughrue, Mion, Zinn, Macpeak & Seas

[57] ABSTRACT

A thermosetting coating composition contains (a) an acrylic resin having hydroxyl groups and epoxy groups in a molecule thereof; (b) a resin prepared from a monomer having an unsaturated group and an acid anhydride group the acid anhydride group being half-esterified, half-thioesterified and/or half-amidized; (c) at least one of hydroxyl group-containing resin selected from the group consisting of an acrylic resin containing hydroxyl groups and carboxyl groups, a fluorine-containing copolymer resin and a polyester resin; and (d) a melamine resin.

38 Claims, No Drawings

THERMOSETTING COATING COMPOSITION AND COATED ARTICLE

This is a continuation of application Ser. No. 07/813,915 filed Dec. 27, 1991, now abandoned.

BACKGROUND OF THE INVENTION

The present invention relates to a thermosetting coating composition, and more particularly to a thermosetting coating composition showing good dispersibility of pigments, usable as a high-solid coating composition, capable of providing a coated layer having excellent acid resistance and scuff (mar) resistance as well as good weathering resistance, substantially free from the harmfulness of a polyisocyanate compound, which is suitable as a topcoat composition for automobiles, and as a coating composition for coils, home electric appliances, electric parts, etc.

Topcoats of automobiles are generally made of a combination of a hydroxyl group-containing polymer and a melamine resin as a curing agent. Coated layers produced from the coating composition containing a melamine resin as a curing agent generally have good surface hardness, but show poor acid resistance. Accordingly, such coated layers are susceptible to coating defects caused by acid rain, etc. The poor acid resistance is presumably due to the presence of a triazine ring in the melamine resin.

In view of this fact, development has been conducted to provide a coating composition containing no melamine resin. For instance, a curing agent using a polyisocyanate compound has been proposed. However, handling of a coating composition containing a polyisocyanate compound as a curing agent requires much attention with respect to safety.

Also, a proposal has been made to provide a high-solid, thermosetting coating composition containing a low-molecular weight polyoxide, a low-molecular weight hydroxyl group-containing polyfunctional material, a curing agent consisting essentially of an acid anhydride, and an acid catalyst (U.S. Pat. No. 4,755,581). However, since this coating composition contains a curing agent showing too high a reactivity, it is difficult to store this coating composition in a one-pack system, and its coating operation is hard to conduct.

As a coating composition which has overcome the difficulty of handling of polyisocyanate and is usable in a one-pack system, EP 353,734 discloses a thermosetting coating composition containing a polymer in which acid anhydride groups are subjected to ring opening and half-esterification (one of two branches produced by the ring opening is esterified), a hydroxy group-containing compound, and an epoxy compound. A coated layer obtained from this coating composition shows improved acid resistance, but it still shows insufficient water resistance and weathering resistance, etc. It is also a little poor in scuff (mar) resistance.

With respect to the topcoats of automobiles, they are required to have good dispersibility of pigments in addition to the above acid resistance, scuff (mar) resistance, water resistance and weathering resistance. Also, to prevent air pollution, it is required that a coating composition has as high a solid content as possible to reduce its solvent content.

OBJECT AND SUMMARY OF THE INVENTION

Accordingly, an object of the present invention is to provide a thermosetting coating composition suitable as a topcoat composition for automobiles, and as a coating composition for coils, home electric appliances, electric parts, etc.

Another object of the present invention is to provide a thermosetting coating composition capable of providing a coated layer having excellent acid resistance and scuff (mar) resistance as well as good weathering resistance.

A further object of the present invention is to provide a thermosetting coating composition showing good dispersibility of pigments, usable in a high-solid manner.

A still further object of the present invention is to provide a so-called high-solid type, thermosetting coating composition whose solvent content is reduced to prevent air pollution.

As a result of intense research in view of the above objects, the inventors have found that by mixing an acrylic resin having hydroxyl groups and epoxy groups in a molecule thereof; a resin prepared from a monomer having an unsaturated group and an acid anhydride group (the acid anhydride group is half-esterified, half-thioesterified and/or half-amidized); a particular hydroxyl group-containing resin; and a melamine resin, a coating composition having a well balanced combination of the above properties can be obtained. The present invention has been completed based on this finding.

Thus, the thermosetting coating composition according to the present invention comprises:

(a) an acrylic resin having hydroxyl groups and epoxy groups in a molecule thereof;

(b) a resin prepared from a monomer having an unsaturated group and an acid anhydride group, the acid anhydride group being half-esterified, half-thioesterified and/or half-amidized;

(c) at least one hydroxyl group-containing resin selected from the group consisting of an acrylic resin containing hydroxyl groups and carboxyl groups, a fluorine-containing copolymer resin and a polyester resin; and (d) a melamine resin.

The coated article according to the present invention has coated layers of an electrodeposition layer, an intermediate layer, a basecoat layer, and a topcoat layer, said topcoat layer being formed from a thermosetting coating composition comprising (a) an acrylic resin having hydroxyl groups and epoxy groups; (b) a resin prepared from a monomer having an unsaturated group and an acid anhydride group, the acid anhydride group being half-esterified, half-thioesterified and/or half-amidized; (c) at least one hydroxyl group-containing resin selected from the group consisting of a acrylic resin containing hydroxyl groups and carboxyl groups, a fluorine-containing copolymer resin and a polyester resin; and (d) a melamine resin.

DETAILED DESCRIPTION OF THE INVENTION

The present invention will be explained in detail below.

[A] Acrylic resin containing hydroxyl groups and epoxy groups in its molecule (acrylic resin A)

The acrylic resin A contains preferably 2-10, more preferably 3-8 epoxy groups, and preferably 2-12, more preferably 4-10 hydroxyl groups in its molecule.

The acrylic resin A has an epoxy equivalent of 100-800, preferably 200-600, and a hydroxy equivalent of 200-1200, preferably 400-1000. If the epoxy equivalent is lower than the above lower limit the coating composition shows poor curability, and if the epoxy equivalent exceeds the above upper limit the resulting coated layer becomes too hard and shows poor weathering resistance. If the hydroxy equivalent is lower than the above lower limit of 200 the cured coated layer shows insufficient water resistance, and if the hydroxy equivalent exceeds the about upper limit of 1200 a high-solid coating composition cannot easily be obtained. Most preferably, the acrylic resin A has an epoxy equivalent of 250-500, and a hydroxy equivalent of 500-800.

The acrylic resin A may be a low-molecular weight compound or a high-molecular weight resin.

In the case of a low-molecular weight compound, trimethylolpropane diglycidyl ether, etc., are preferable.

In the case of a high-molecular weight resin, a copolymer produced from (a) 30-70% by weight of a radically polymerizable monomer containing an epoxy group, (b) 10-50% by weight of a radically polymerizable monomer containing a hydroxyl group, and (c) a remaining amount of another radically polymerizable monomer (hereinafter referred to as "copolymer A"), or a resin composition containing such a copolymer may be used.

(a) Radically polymerizable monomer containing an epoxy group

The radically polymerizable monomer containing an epoxy group is, for instance, glycidyl acrylate, glycidyl methacrylate, 3,4-epoxycyclohexanyl methyl methacrylate, etc.

(b) Radically polymerizable monomer containing a hydroxyl group

The radically polymerizable monomer containing a hydroxyl group is, for instance, 2-hydroxyethyl acrylate, 2-hydroxyethyl methacrylate, 4-hydroxybutyl acrylate, Praccel FM-1 (Daicel Chemical Industries, Ltd.), etc.

(c) Other radically polymerizable monomer

The other radically polymerizable monomer is, for instance, styrene, α-methylstyrene, acrylates such as methyl acrylate, ethyl acrylate, butyl acrylate, and 2-ethylhexyl acrylate, methacrylates such as methyl methacrylate, ethyl methacrylate, n-butyl methacrylate, isobutyl methacrylate, t-butyl methacrylate, 2-ethylhexyl methacrylate, and lauryl methacrylate, acrylamide, methacrylamide, etc.

The copolymer A may be obtained by a usual radical polymerization method from the above monomers (a)-(c) in the presence of a radical polymerization initiator such as t-butyl peroxy-2-ethylhexanoate, dimethyl-2,2'-azobisisobutylate, etc. Incidentally, the amount of the radical polymerization initiator is preferably 3-15 parts by weight per 100 parts by weight of the total amount of the monomers (a)-(c). Additives such as a chain transfer agent, etc. may be added to the monomers. The copolymerization of the monomers (a)-(c) for producing the copolymer A may be conducted at a temperature of 100°-140° C. for 3-8 hours.

The copolymer A obtained under the above conditions has an epoxy equivalent of 100-800, preferably 200-600, and most preferably 250-500, a hydroxy equivalent of 200-1200, preferably 400-1000, and most preferably 500-800, and a number-average molecular weight of 500-40000, preferably 1000-20000.

[B] Resin B

The resin B is produced from monomers containing unsaturated groups and acid anhydride groups and other copolymerizable monomers.

The monomers containing unsaturated groups and acid anhydride groups may be itaconic anhydride, maleic anhydride, etc.

The other copolymerizable monomers may be styrene, α-methylstyrene, acrylates such as methyl acrylate, ethyl acrylate, butyl acrylate, and 2-ethylhexyl acrylate, methacrylates such as methyl methacrylate, ethyl methacrylate, n-butyl methacrylate, isobutyl methacrylate, t-butyl methacrylate, 2-ethylhexyl methacrylate, and lauryl methacrylate, acrylamide, methacrylamide, etc.

The copolymerization of the above two types of monomers may be conducted by a usual polymerization method. The resulting copolymer (resin B) has a number-average molecular weight of 500-40000, preferably 1000-20000, and most preferably 5000-10000. When the number-average molecular weight of the copolymer (resin B) is larger than 40000, the copolymer (resin B) shows too high a viscosity, failing to provide a thermosetting coating composition having a high solid content. On the other hand, when it is smaller than 500, the thermosetting coating composition shows poor curability. Incidentally, the number-average molecular weight is measured by a gel permeation chromatography (GPC) method. In the resin B, the number of the acid anhydride groups in one molecule is at least 2, preferably 2-5. If the number of the acid anhydride groups in one molecule is smaller than 2, the resulting thermosetting coating composition shows poor curability.

The copolymer (resin B) is half-esterified, half-thioesterified and/or half-amidized in its acid anhydride groups (one of two branches of the acid anhydride groups is esterified, thioesterified and/or amidized). Incidentally, the term "amidize" used herein means "to form an amide group (—CONH—) between an acid anhydride group and an amide group-forming compound such as an amine."

The half-esterification, half-thioesterification and/or half-amidization may be carried out after the copolymerization of the above monomers, or the copolymerization may be carried out after reacting the monomer containing unsaturated groups and acid anhydride groups with a compound having active hydrogens for forming an ester group, a thioester group or an amide group. In the case of conducting copolymerization after the above reaction with the compound having active hydrogens, the above other copolymerizable monomers may be those containing hydroxyl groups, for instance, 2-hydroxyethyl acrylate, 2-hydroxyethyl methacrylate, etc.

The half-esterification, half-thioesterification or half-amidization can be confirmed by infrared spectroscopy (IR). In the case of the half-esterification, it can be confirmed by the absorption of acid anhydride groups at 1785 $cm^{-1}$.

Half-esterification agents usable in the present invention are low-molecular weight alcohols (having preferably 1-4 carbon atoms) such as methanol, ethanol, i-propanol, t-butanol, i-butanol, methyl cellosolve, ethyl cellosolve, dimethylaminoethanol, acetol, etc.

Half-thioesterification agents usable in the present invention are low-molecular weight mercaptans such as ethyl mercaptan, propyl mercaptan, butyl mercaptan, etc.

Half-amidization agents usable in the present invention are low-molecular weight amines such as ethyl amine, butyl amine, aniline, etc.

Among them, the half-thioesterification agents are somewhat strong in odor. Accordingly, the half-esterification agents and the half-amidization agents are preferable. Particularly preferable are t-butanol, dimethylaminoethanol, diethylaminoethanol, acetol, and aniline.

The half-esterification, half-thioesterification or half-amidization can be conducted by a usual method at a temperature between room temperature and 120° C., optionally in the presence of a tertiary or quaternary ammonium salt as a catalyst.

[C] Hydroxyl group-containing resin

In the present invention, the hydroxyl group-containing resin is selected from an acrylic resin, a fluorine-containing copolymer resin and a polyester resin, depending on the applications of the thermosetting coating composition. To make clear the difference from the acrylic resin A, the acrylic resin used for the hydroxyl group-containing resin will be named as "acrylic resin C."

For the purpose of obtaining a thermosetting coating composition showing improved scuff (mar) resistance, film appearance and weathering resistance and containing as little a solvent as possible (high solid-type), the acrylic resin C is preferable. For the purpose of achieving good water resistance and weathering resistance, the fluorine-containing copolymer resin is preferable. Also, for the purpose of achieving good scuff (mar) resistance, chipping resistance and pigment dispersibility, the polyester resin is preferable. Incidentally, to achieve the above effects in combination, the acrylic resin C, two or more of the fluorine-containing copolymer resin and the polyester resin may be contained.

(a) acrylic resin C

The acrylic resin C usable in the present invention may be produced by a usual method from the following monomers:

(1) Ethylenic monomers containing hydroxyl groups such as hydroxymethyl acrylate, hydroxymethyl methacrylate, hydroxyethyl acrylate, hydroxyethyl methacrylate, hydroxypropyl acrylate, hydroxypropyl methacrylate, hydroxybutyl acrylate, hydroxybutyl methacrylate, N-methylol acrylamine, etc.;

(2) Ethylenic monomers containing carboxyl groups such as acrylic acid, methacrylic acid, crotonic acid, itaconic acid, fumaric acid, maleic acid, etc.;

(3) Ethylenic monomers copolymerizable with the above monomers (1) and (2) such as alkyl acrylates and alkyl methacrylates including methyl acrylate, methyl methacrylate, ethyl acrylate, ethyl methacrylate, propyl acrylate, propyl methacrylate, n-butyl acrylate, isobutyl acrylate, t-butyl acrylate, 2-ethylhexyl acrylate, n-octyl acrylate, n-dodecyl acrylate, etc., and acrylonitrile, methacrylonitrile; and (4) Styrene, and styrene derivatives such as α-methylstyrene, o-methylstyrene, m-methylstyrene, p-methylstyrene, p-tert-butylstyrene, etc.

The acrylic resin C used in the present invention needs not be cross-linkable by itself, but if it is required to be cross-linkable, so-called cross-linkable monomers having 2 or more radically polymerizable unsaturated groups in their molecules should be added. The cross-linkable monomers having 2 or more radically polymerizable unsaturated groups in their molecules may be polymerizable unsaturated compounds such as ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol diacrylate, glycerol dimethacrylate, glycerolallyloxy dimethacrylate, 1,1,1-tris (hydroxymethylethane) diacrylate, 1,1,1-tris (hydroxymethylethane) triacrylate, 1,1,1-tris (hydroxymethylethane) dimethacrylate, 1,1,1-tris (hydroxymethylethane) trimethacrylate, 1,1,1-tris (hydroxymethylpropane) diacrylate, 1,1,1-tris (hydroxymethylpropane) triacrylate, 1,1,1-tris (hydroxymethylpropane) dimethacrylate, 1,1,1-tris (hydroxymethylpropane) trimethacrylate, diallyl terephthalate, diallyl phthalate, glycidyl acrylate, glycidyl methacrylate, triallyl cyanurate, triallyl isocyanurate, etc. The amount of the cross-linkable monomer added to the acrylic resin C may be up to 20% by weight, based on 100% by weight of the acrylic resin C.

Since the acrylic resin C is cross-linked by the melamine resin in the present invention, the acid value (AV) and hydroxyl value (OHV) of the acrylic resin C, which are parameters showing the cross-linkability of the acrylic resin C, are important.

Among the components (1)–(4) constituting the acrylic resin C, main components contributing to the acid value (AV) are (2) carboxyl group-containing monomers such as acrylic acid, methacrylic acid, etc., and components contributing to the hydroxyl value (OHV) are (1) hydroxyl group-containing acrylic monomers such as 2-hydroxyethyl acrylate, 2-hydroxyethyl methacrylate, hydroxypropyl acrylate, hydroxypropyl methacrylate, etc.

From the aspect of the cross-linkability of the acrylic resin C by the melamine resin, it is preferable to adjust the acid value (AV) and hydroxyl value (OHV) of the acrylic resin C to 10–50, and 60–180, respectively. If the acid value (AV) is lower than 10 or the hydroxyl value (OHV) is lower than 60, the tensile strength of the resulting coated layer is insufficient. On the other hand, if the acid value (AV) exceeds 50 or the hydroxyl value (OHV) exceeds 180, the resulting coated layer shows poor water resistance. The preferred acid value (AV) of the acrylic resin C is 15–25, and the preferred hydroxyl value (OHV) of the acrylic resin C is 125–140. Incidentally, the acid value (AV) and the hydroxyl value (OHV) are expressed by a unit of KOHmg/g.

To improve the scuff (mar) resistance of the coated layer, it is desirable that the acrylic resin C has as high a hydroxyl value (OHV) as possible. Specifically, it is desirable that the acrylic resin C has a hydroxyl value (OHV) of 100–180.

The acrylic resin C constituted by such components (1)–(4) preferably has a number-average molecular weight of about 1000–10000. When the number-average molecular weight of the acrylic resin C is smaller than 1000, the resulting coated layer shows poor weathering resistance. On the other hand, when the number-average molecular weight of the acrylic resin C is larger than 10000, the coated layer shows poor film appearance. In a case where a high-solid coating composition is desired, the acrylic resin C preferably has a relatively low molecular weight, specifically in the range of 1000–5000. Incidentally, the above number-average molecular weight is measured by a gel permeation chromatography (GPC) method.

(b) Fluorine-containing resin

In the present invention, the following three types of fluorine-containing resins can be used.

(1) First fluorine-containing copolymer resin

The first fluorine-containing copolymer resin is a copolymer containing as an indispensable component a fluorine-containing vinyl monomer. This fluorine-containing copolymer preferably has a composition of a fluorine-containing vinyl monomer, a linear alkyl vinyl monomer, a cycloalkyl vinyl monomer, a hydroxyalkyl vinyl monomer, and a carboxyl group-containing monomer.

The fluorine-containing vinyl monomers are preferably fluoroolefins or fluoroalkyl olefins. Preferred examples of the fluoroolefins are perhaloolefins, particularly chlorotrifluoroethylene or tetrafluoroethylene.

As the linear alkyl vinyl monomers, alkyl vinyl ethers are preferable, and those particularly preferable are alkyl vinyl ethers having linear or branched alkyl groups having 2–8 carbon atoms, particularly 2–4 carbon atoms, such as ethyl vinyl ether, butyl vinyl ether, etc.

As the cycloalkyl vinyl monomers, cyclohexyl vinyl monomers, particularly cyclohexyl vinyl ether, etc. are preferable.

Further, as the hydroxyalkyl vinyl monomers, those having ether structures are preferable, and particularly hydroxyalkyl vinyl monomers having the same alkyl groups as in the above linear alkyl vinyl ethers, such as hydroxyethyl vinyl ether, hydroxybutyl vinyl ether, hydroxyhexyl vinyl ether, etc. are preferable.

The carboxyl group-containing monomers may be those containing carboxyl groups, such as acrylic acid, methacrylic acid, crotonic acid, ethacrylic acid, propylacrylic acid, isopropylacrylic acid, itaconic acid, maleic anhydride, fumaric acid, etc.

The first fluorine-containing copolymer resin containing the above components as indispensable monomers preferably has a composition consisting essentially of 40–60 mole % of a fluoroolefin. 45–5 mole % of a cycloalkyl vinyl monomer, 45–5 mole % of a linear alkyl vinyl monomer, 5–45 mole % of a hydroxyalkyl vinyl monomer, and 3–15 mole % of a carboxyl group-containing monomer. Incidentally, with respect to the fluoroolefin and the alkyl vinyl monomer, they may be used alone or in combination.

When the amount of the fluoroolefin is too small, the resulting coated layer shows insufficient weathering resistance. On the other hand, when it is too large, the formation of the coated layer is difficult and the coated layer shows poor recoatability. When the amount of the cycloalkyl vinyl monomer is too small, the coated layer shows low hardness. Also, when the amount of the lineax alkyl vinyl monomer is too small, the first fluorine-containing copolymer resin tends to show poor flexibility.

It is particularly important that the hydroxyalkyl vinyl monomer is contained in the amount as described above in the fluorine-containing copolymer resin, for the purpose of improving the curability of the thermosetting coating composition without deteriorating the useful properties of the fluorine-containing copolymer resin as a base material of the coating composition. That is, when the content of the hydroxyalkyl vinyl monomer is too high, the fluorine-containing copolymer resin shows poor solubility in an organic solvent, and the resulting coated layer shows poor flexibility. On the other hand, when the content of the hydroxyalkyl vinyl monomer is too low, the resulting coated layer tends to show poor durability and adhesion to an underlying coated layer.

The first fluorine-containing copolymer resin can be produced by a copolymerization method described in Japanese Patent Publication No. 60-21686 from a mixture of the above monomers in desired proportions in a polymerization solvent (for instance, an aromatic hydrocarbon such as xylene, toluene, etc., an ester solvent, an ether solvent, etc.), in the presence of a polymerization initiator (for instance, a peroxide compound such as benzoil peroxide, etc. an azo compound such as azobisisobutyronitrile, etc.). Incidentally, the copolymerization temperature is not particularly restricted, but it should be high enough to decompose the polymerization initiator.

Such first fluorine-containing copolymer resins are commercially available as Lumiflon LF 100, 200, 210, 300, 400, 502, 504, 550, 552, 554, 700, 800, 916, etc. from Asahi Glass Co., Ltd.

(2) Second fluorine-containing copolymer resin

The second fluorine-containing copolymer resin consists essentially of a fluoroolefin, a vinyl carboxylate, a hydroxyalkyl vinyl ether, and an alkyl vinyl ether, and it may optionally contain other vinyl monomers copolymerizable with the above monomers.

Typical examples of the fluoroolefins are preferably tetrafluoroethylene, vinylidene fluoride, chrolotrifluoroethylene, hexafluoropropylene, etc. These fluoroolefins may be used alone or in combination.

The content of the fluoroolefin in the second fluorine-containing copolymer resin is 10–70 mole %, preferably 20–60 mole % based on the total amount of the monomers used. When the content of the fluoroolefin exceeds 70 mole %, the cured coated layer shows poor gloss. On the other hand, when it is lower than 10 mole %, excellent properties of the fluorolefin such as chemical resistance, weathering resistance, etc. are not sufficiently exhibited.

Typical examples of the vinyl carboxylates are vinyl esters of linear or branched aliphatic carboxylic acids, such as vinyl acetate, vinyl propyonate, vinyl butyrate, vinyl isobutyrate, vinyl pivalate, vinyl caproate, vinyl caprylate, vinyl caprate, vinyl versate, vinyl laurate, vinyl stearate, etc.; vinyl esters of cycloaliphatic carboxylic acids, such as vinyl cyclohexanecarboxylate, etc.; and vinyl esters of aromatic carboxylic acids, such as vinyl benzoate, vinyl p-t-butylbenzoate, vinyl salicylate, etc.

The content of the vinyl carboxylate in the second fluorine-containing copolymer resin is 5–70 mole %, preferably 10–60 mole % based on the total amount of the monomers used. These vinyl carboxylates may be used alone or in combination.

The hydroxyalkyl vinyl ethers may be the same as used in the first fluorine-containing copolymer resin, and it may be used alone or in combination. The content of the hydroxyalkyl vinyl ether in the second fluorine-containing copolymer resin is 3.5–30 mole %, preferably 5–25 mole % based on the total amount of the monomers used. When the content of the hydroxyalkyl vinyl ether is lower than 3.5 mole %, the curing time is too long and the resulting coated layer shows poor resistance to contamination. On the other hand, when it exceeds 30 mole %, the curing time decreases when mixed with a curing agent, so that the coating operation of the coating composition becomes difficult.

The alkyl vinyl ethers may be the same as linear or cyclo- alkyl vinyl ethers used in the first fluorine-containing copolymer resin, and they may be used alone or in combination. The content of the alkyl vinyl ether in the second fluorine-containing copolymer resin is 5–70 mole %, preferably 7–60 mole % based on the total amount of the monomers used. When the content of the alkyl vinyl ether is lower than 5 mole %, the conversion rate of the fluoroolefin in the process of preparing the vinyl copolymers tends to be small. On the other hand, when it exceeds 70 mole %, the resulting coated layer has a small fluorine content, resulting in the coated layer with poor water resistance.

Typical examples of the other vinyl monomers copolymerizable with the above monomers and usable in such an amount as not to deteriorate the properties of the resulting coated layer according to the present invention include α-olefins such as ethylene, propylene, butene-1, etc.; halogenated olefins (excluding fluoroolefins) such as vinyl chloride, vinylidene chloride, etc.; aromatic vinyl compounds such as styrene, α-methyl styrene, vinyl toluene, etc.; alicyclic or aromatic vinyl ethers; allyl group-containing compounds such as allyl alcohol, allyl glycidyl ether, etc.; mono- or di- esters of unsaturated polybasic acids such as fumalic acid, maleic acid, etc.; unsaturated polybasic acids or their anhydrides such as maleic acid, maleic anhydride, itaconic acid, iraconic anhydride, etc.; and acrylonitrile, methacrylonitrile, acrylamide, methacrylamide, N-methylol acrylamide, N-methylol methacrylamide, N-butoxymethyl acrylamide, N-butoxymethyl methacrylamide, acrylic acid esters, methacrylic acid esters, etc.

The second fluorine-containing copolymer resins are commercially available as Fluonate K700 series from Dainippon Ink and Chemicals, Inc.

(3) Third fluorine-containing copolymer resin

The third fluorine-containing copolymer resin is a fluorinated acrylic resin constituted by an acrylic resin and a fluoroolefin, and its preferred examples are acrylic resins whose end groups are substituted by fluoroolefins, and acrylic resins grafted with fluoroolefins. Such fluorinated acrylic resins are commercially available as AS2950, AS2986, etc. from Mitsubishi Rayon Co., Ltd.

Each of the above-explained three fluorine-containing copolymer resins is preferably controlled to have an acid value (AV) of 5–35 and a hydroxyl value (OHV) of 60–180, from the aspect of cross-linkability by a melamine resin. When the acid value (AV) is lower than 5, or when the hydroxyl value (OHV) is lower than 60, the curing of the coating composition is insufficient. On the other hand, when the acid value (AV) exceeds 35, the coated layer shows poor water resistance, and when the hydroxyl value (OHV) exceeds 180, the coated layer is too hard, showing poor elongation. The preferred acid value (AV) is 10–25, and the preferred hydroxyl value (OHV) is 125–140.

Each of the fluorine-containing copolymer resins consisting of such components preferably has a weight-average molecular weight of about 8000–20000. When the weight-average molecular weight of each fluorine-containing copolymer resin is smaller than 8000, the resulting coated layer shows poor weathering resistance, On the other hand, when the weight-average molecular weight of each fluorine-containing copolymer resin is larger than 20000, the coated layer has poor appearance.

(C) Polyester resin

The polyester resins usable in the present invention include (1) polyester resins modified with hydroxyl group-containing urethanes, (2) polyester resins or alkyd resins, (3) polyester resins or alkyd resins partially co-condensed with melamine resins.

(1) Polyester resin modified with hydroxyl group-containing urethane

The polyester resin modified with a hydroxyl group-containing urethane is a resin having a polyester resin portion and a urethane portion, which is produced by reacting the hydroxyl groups of the polyester resin with the isocyanate groups of a polyisocyanate compound to introduce urethane bonds, or by reacting a dibasic acid with the hydroxyl groups of the urethane, a reaction product of polyol and polyisocyanate. Both of the above polyester resins modified with hydroxyl group-containing urethanes contain residual hydroxyl groups.

The polyester resins to be modified with hydroxyl group-containing urethanes are esterification reaction products of polyvalent alcohols and polybasic acids or anhydrides thereof, which contain hydroxyl groups in their molecules.

The polyvalent alcohols which may be used in the present invention include ethylene glycol, diethylene glycol, polyethylene glycol, propylene glycol, dipropylene glycol, polypropylene glycol, neopentyl glycol, 1,2-butanediol, 1,8-butanediol, 2,3 -butanecliol, 1,4-butanediol, 1,5-pentanediol, 1,6-hexanediol, hydrogenated bisphenol A, hydroxyalkyl bisphenol A, 1,4-cyclohexane dimethanol, 2,2-dimethyl-3 -hydroxypropionate, N,N-bis(2-hydroxyethyl)dimethyl hydantoin, polytetramethylene ether glycol, polycaprolacton polyol, glycerin, solbitol, mannitol, trimethylol ethane, trimethylol propane, trimethylol butane, hexanetriol, pentaerithritol, dipentaerithritol, tris(hydroxyethyl)isocyanate, etc. These polyvalent alcohols may be used in combination.

The polybasic acids or their anhydrides which may be used in the present invention include phthalic acid, phthalic anhydride, tetrahydrophthalic acid, tetrahydrophthalic anhydride, hexahydrophthalic acid, hexahydrophthalic anhydride, methyl tetrahydrophthalic acid, methyl tetrahydrophthalic anhydride, himic anhydride, trimellitic acid, trimellitic anhydride, pyromellitic acid, pyromellitic anhydride, isophthalic acid, terephthalic acid, maleic acid, maleic anhydride, fumaric acid, itaconic acid, adipic acid, azelaic acid, sebacic acid, succinic acid, succinic anhydride, lactic acid, dodecenylsuccinic acid, dodecenylsuccinic anhydride, cyclohexane-1,4-dicarboxylic acid, endic anhydride, etc. These polybasic acids or their anhydrides may be used in combination.

The polyester resin usable in the present invention is produced by such a reaction that a molar ratio of the hydroxyl group of the above polyvalent alcohol to the carboxyl group of the above polybasic acid or its anhydride is 1.2–1.8, so that the polyester has residual hydroxyl groups in the molecule.

The polyisocyanate compounds forming urethane bonds with the hydroxyl groups of the polyester resin are compounds having 2 or more free isocyanate groups in their molecules, and their specific examples include tolylene diisocyanate, 4,4'-diphenylmethane diisocyanate, xylylene diisocyanate, metaxylylene diisocyanate, hexamethylene diisocyanate, lysine diisocyanate, hydrogenated 4,4'-diphenylmethane diisocyanate, hydrogenated tolylene diisocyanate, isophorone diisocyanate, trimethyl hexamethylene diisocyanate, dimerized diisocyanate, etc. In addition, urethane compounds produced by reacting the polyisocyanate compounds with small amounts of polyols may be used as long as they contain two or more isocyanate groups in one molecule. Such urethane compounds are selected from an adduct of tolylene diisocyanate (3 mol) and trimethylol propane (1 mol); an adduct of hexamethylene diisocyanate (3 mol) and trimethylol propane (1 mol); a reaction product of hexamethylene diisocyanate and water; an adduct of xylylene diisocyanate (3 mol) and trimethylol propane (1 mol), etc., and they may be used alone or in combination.

Preferable among the above polyisocyanate compounds are those having a good weathering resistance and thus suffering from no yellowish discoloration, such as a reaction product of hexamethylene diisocyanate and water; an adduct of hexamethylene diisocyanate and trimethylol propane; an adduct of xylylene diisocyanate and trimethylol propane; isophorone diisocyanate; hexamethylene diisocyanate; lysine diisocyanate, etc.

The polyester resin modified with a hydroxyl group-containing urethane usable in the present invention is produced by reacting the hydroxyl groups of the polyester resin with the isocyanate groups of the polyisocyanate compound in a molar ration (hydroxyl group/isocyanate group) of 1.1–1.5, or by reacting the hydroxyl groups of the urethane with a dibasic acid. The polyester resin modified ;with a hydroxyl group-containing urethane preferably has an acid value (AV) of 5–40, and a hydroxyl value (OHV) of 40–200, and further has a number-average molecular weight of 500–10000.

(2) Polyester resin

In the present invention, polyester resins or alkyd resins (polyester resins modified with oil components) for the intermediate coatings of automobiles are used. The polyester resins can be produced by a .known condensation reaction from the same polyvalent alcohols and polybasic acids as described above as starting materials of the polyester resins modified with hydroxyl group-containing urethanes. Incidentally, the epoxy resins may also be used as polyvalent alcohols.

This polyester resin preferably has an acid value of 2–20, and a hydroxyl value of 70–300. When any one of the acid value and the hydroxyl value is lower than the above lower limit, the curability of the coating composition is poor. On the other hand, when the acid value exceeds 20, the resulting coated layer shows poor water resistance, and when the hydroxyl value exceeds 300, the pigment dispersibility is reduced. The preferred ranges of the acid value and the hydroxyl value are 5–10, and 110–120, respectively.

The number-average molecular weight of the polyester resin is preferably 400–6000, more preferably 1000–2500. When the number-average molecular weight of the polyester resin is lower than the above lower limit, the curability of the coating composition is poor, and when the number-average molecular weight of the polyester resin exceeds the above upper limit, the coated layer shows poor surface smoothness. Incidentally, for the purpose of obtaining the high-solid coating composition, the polyester resin should have a number-average molecular weight of 300–1000.

In place of the above polyester resin, an alkyd resins may be used. The alkyd resin can be produced by adding to a mixture of the polyalcohol and the polybasic acid as starting materials of the above polyester resin, an oil such as china wood oil, olive oil, castor oil, coconut oil, dehydrated castor oil, linseed oil, soybean oil safflower oil, cottonseed oil, rice bran oil, or these aliphatic acids, laurie acid, myristic acid, palmitic acid, stearic acid, tall oil aliphatic acid, 2,3-epoxypropanoil ester of $\alpha$-alkyl $c_9$–$c_{11}$ monocarboxylic acid (Cardura E, manufactured by Exxon Chemical K. K.), etc., and subjecting them to a known condensation reaction.

The alkyd resin preferably has an acid value of 2–20, and a hydroxyl value of 70–300. When any one of the acid value and the hydroxyl value is lower than the above lower limits, the curability of the coating composition is poor. On the other hand, when the acid value exceeds 20, the resulting coated layer shows poor water resistance, and when the hydroxyl value exceeds 300, the pigment dispersibility is reduced. The more preferred ranges of the acid value and the hydroxyl value are 5–10, and 75–90, respectively.

The alkyd resin preferably has a number-average molecular weight of 400–6000, and an oil length of 40 or less. When the number-average molecular weight of the alkyd resin is lower than 400, the curability of the coating composition is poor, and when the number-average molecular weight of the alkyd resin exceeds 6000, the coated layer shows poor surface flatness. Incidentally, for the purpose of obtaining a high-solid coating composition, the alkyd resin should have a number-average molecular weight of 300–1000. With respect to the oil length, if it exceeds 40, the compatibility of the alkyl resin with the melamine resin is reduced, and the resulting coated layer shows poor weathering resistance.

(3) Polyester resin or alkyd resin partially co-condensed with melamine resin

In the present invention, the polyester resin or alkyd resin partially co-condensed with a melamine resin may be used. By using such polyester resin or alkyd resin, the dispersibility of pigments is improved.

The polyester resin or alkyd resin partially co-condensed with a melamine resin can be produced by subjecting the polyester resin or alkyd resin described in (2) above and a melamine resin which is etherified by adding an aliphatic aldehyde, to a co-condensation reaction in a proportion (polyester or alkyd/melamine resin) of 100/1–100/15. The polyester resin or alkyd resin partially co-condensed with a melamine resin preferably has an acid value of 5–20, a hydroxyl value of 70–300, and a number-average molecular weight of 800–8000.

[D] Melamine resin

The melamine resin usable in the present invention is an etherification product of an adduct of a melamine resin and an aliphatic aldehyde such as formaldehyde which is usually called "alkyl ether melamine resin." In the alkyl ether melamine resin, hydrogen atoms of methylol groups bonded to its amino groups are substituted by alkyl groups such as a methyl group, an ethyl group, an n-butyl group, an isobutyl group, etc. Specific examples of such alkyl ether melamine resins are a methyl ether-bonded melamine resin, methylbutylether-bonded melamine resin, a butylether-bonded melamine resin, etc.

Particularly, to achieve a high-solid coating composition and a coated layer with improved scuff (mar) resistance, it is desirable to use a melamine resin having a high alkyl ether ratio together with an acid catalyst described below. The high-alkyl ether melamine resin is a melamine resin whose methylol amino groups are completely or considerably bonded with alkyl ethers, the percentage of the alkyl ether groups per each triazine ring being 50% or more. The amount of the alkyl ether groups is expressed as an average percentage of the alkyl ether groups actually bonded to the triazine ring, assuming that it is 100% when all of the hydrogen atoms of the amino groups in the melamine resin are substituted by alkanol and then all end OH groups are substituted by alkoxy groups. Since there are three amino groups per each triazine ring, "50% or more of the alkyl ether groups" means that 3 or more alkyl ether groups are bonded to the triazine ring on average.

With respect to the amount of each components [A], [B], [C] and [D] on a solid basis, it is preferable that [A] is 10-60% by weight, [B] is 10-50% by weight, [C] is 10-45% by weight, and [D] is 5-20% by weight under the condition that [A]+[B]+[C]+[D]=100% by weight. Outside the above composition ranges, the resulting coated layer shows poor acid resistance, scuff (mar) resistance, surface appearance, etc., failing to provide the coated layer with well balanced properties. More preferable amount of each component [A], [B], [C] and [D] on a solid basis is: [A] 10-30% by weight, [B] 20-40% by weight, [C] 25-45% by weight, and [D] 10-20% by weight. Incidentally, when two or more of the acrylic resin C, the fluorine-containing copolymer resin and the polyester resin are used as the components [C], the amount of the total components [C] should be within the range as described above.

[E] Catalyst

An acid catalyst and an esterification catalyst are used in the present invention.

(1) Acid Catalyst

The acid catalysts used in the present invention mean those acids containing carbon-carbon bonds in the molecule excluding a carbonic acid. Typical examples of the acid catalysts include carboxylic acids such as acetic acid, lactic acid, succinic acid, oxalic acid, maleic acid, decanedicarboxylic acid, acrylic acid, methacrylic acid, etc.; sulfonic acids such as dodecylbenzenesulfonic acid, dinonylnaphthalenedisulfonic acid, etc.; esters of organic alkyl phosphoric acids such as dimethyl phosphoric acid, dibutyl phosphoric acid, dimethyl pyrophosphoric acid, dibutyl pyrophosphoric acid, etc. Among these organic acids, sulfonic acids, particularly those having 6 or more (particularly 10 or more) carbon atoms such as dodecylbenzene sulfonic acid and para-toluenesulfonic acid are preferable from the viewpoint of curability, rust resistance, chipping resistance, etc.

The acid catalyst is blocked with a blocking agent which can be dissociated at a baking temperature of a usual coated layer. As the blocking agent, an amine is preferable. The amines usable in the present invention include primary, secondary or tertiary alkylamines, alkanolamines, alicyclic amines, N-heterocyclic amines, etc., each having 40 or less carbon atoms. Their specific examples are ethylamine, diethylamine, triethylamine, ethanolamine, diethanolamine, triethanolamine, n-, iso-, sec-, or tert- butylamine, N,N-dimethyl stearylamine, morpholine, tri- or iso- propanolamine, etc.

The amount of the acid catalyst is preferably 0.05-5 parts by weight per 100 parts by weight of the resin components (solid basis). When the amount of the acid catalyst is smaller than 0.05 parts by weight, it does not sufficiently contribute to the curing of the coating composition. On the other hand, when the amount of the acid catalyst is larger than 5 parts by weight, the resulting coated layer becomes too hard. The more preferred amount of the acid catalyst is 0.05-3 parts by weight.

(2) Esterification Catalyst

The esterification catalysts may be those usually used in an esterification reaction (reaction between acid and epoxy), and for instance, quaternary ammonium salts are particularly preferable. Specific examples thereof are benzyltrimethyl ammonium chloride, benzyltrimethyl ammonium bromide, benzyltributyl ammonium chloride, benzyltributyl ammonium bromide, benzyltriethyl ammonium chloride, benzyltriethyl ammonium bromide, tetrabutyl ammonium chloride, tetrabutyl ammonium bromide, etc. The amount of the esterification catalyst is preferably 0.01-1 parts by weight.

[F] Other Components

In addition to the above components, the thermosetting coating composition of the present invention may contain coloring pigments, metallic pigments, metallic-like pigments, body pigments, organic solvents, supplemental cross-linking agents, and various additives.

The coloring pigments include titanium dioxide, basic lead carbonate, zinc sulfide, graphite, carbon black, yellow iron oxide, red iron oxide, phthalocyanine blue, phthalocyanine green, quinacridone, indanthrone, isoindolenone, perylene, anthrapyrimidine, benzimidazolone, etc.

The metallic pigments and metallic-like pigments include mica, finely divided metal flakes such as aluminum flakes, bronze flakes, tin flakes, gold flakes, silver flakes, copper flakes, titanium flakes, stainless steel flakes, nickel flakes, chromium flakes, metal compound powders such as cobalt sulfide, manganese sulfide, titanium sulfide, etc., finely divided metal flakes coated with plastics, flake-shaped phthalocyanine blue, etc.

The body pigments include inorganic pigments such as calcium carbonate, magnesium carbonate, barium sulfate, silicate, aluminum hydroxide, calcium sulfate, etc.

The organic solvents may be organic liquids or their mixtures commonly used in the field of painting, and specific examples thereof include, for instance, aromatic hydrocarbons such as xylene, toluene, etc.; aliphatic hydrocarbons such as n-hexane, heptane, etc.; petrolium fractions having various boiling points mainly consisting of aliphatic hydrocarbons and small amounts of aromatic hydrocarbons; esters such as butyl acetate, ethylene glycol diacetate, 2-ethoxyethyl acetate, etc.; ketones such as methyl isobutyl ketone, etc.; alcohols such as butyl alcohol, etc.

The supplemental cross-linking agents include isocyanate compounds blocked with alcohols, oximes, etc., and the preferred isocyanate compounds are aliphatic or alicyclic isocyanates. The supplemental cross-linking agents may be used together with the melamine resin.

The other additives include ultraviolet absorbers such as benzophenols, antioxidants such as phenols and sulfides, surface adjusters such as silicone, organic polymers, etc., anti-sagging agents, thickening agents, etc., in an amount of about 0.1-5% by weight. These additives are effective to improve the properties of the coating composition and the coated layer when added to the above indispensable components.

In sum, the thermosetting coating composition of the present invention is suitable for the following four types of coating compositions:

(1) Scuff-resistant, clear coating composition
  Component [A]: 10–60% by weight, preferably 10–30% by weight,
  Component [B]: 10–50% by weight, preferably 20–40% by weight,
  Component [C]: 10–45% by weight, preferably 25–45% by weight, and
  Component [D]: 5–20% by weight, preferably 10–20% by weight.

Component [C] is preferably selected to have an acid value of 10–50, a hydroxyl value of 60–180, and a number-average molecular weight of 1000–10000. More preferably, the component [C] is an acrylic resin C having a high hydroxyl value (particularly 100–180).

Component [D] is preferably selected to be a melamine resin having a high alkyl ether content.

In a preferred embodiment, (i) the polyester resin modified with a hydroxyl group-containing urethane, or (ii) the polyester resin or alkyd resin having an acid value of 2–20, a hydroxyl value of 70–300, and a number-average molecular weight of 300–6000 may be added as an additional component [C] alone or in combination.

As a catalyst, the acid catalyst is preferably used, but the esterification catalyst may be used.

The coating composition consisting essentially of the above components can provide a coated layer having excellent acid resistance, scuff (mar)resistance, weathering resistance and film appearance, and such coating composition can be used as a high-solid coating composition.

(2) High-solid, clear coating composition
  Component [A]: 10–60% by weight, preferably 10–30% by weight,
  Component [B]: 10–50% by weight, preferably 20–40% by weight,
  Component [C]: 10–45% by weight, preferably 25–45% by weight, and
  Component [D]: 5–20% by weight, preferably 10–20% by weight.

Component [C] is preferably selected to have an acid value of 10–50, a hydroxyl value of 60–180, and a number-average molecular weight of 1000–10000. More preferably, the component [C] is a low-molecular weight acrylic resin C having a molecular weight of 1000–5000.

Component [D] is preferably selected to be a melamine resin having a high alkyl content.

In a preferred embodiment, the polyester resin or alkyd resin having an acid value of 2–20, a hydroxyl value of 70–300, and a number-average molecular weight of 300–6000, more preferably 300–1000, may be further added as an additional component [C].

As a catalyst, the acid catalyst is preferably used, but the esterification catalyst may be used.

The coating composition consisting essentially of the above components can provide a coated layer having excellent acid resistance, scuff (mar) resistance, weathering resistance and film appearance, and such coating composition can be used as a high-solid coating composition.

(3) Enamel coating composition
  Component [A]: 10–60% by weight, preferably 10–30% by weight,
  Component [B]: 10–50% by weight, preferably 20–40% by weight,
  Component [C]: 10–45% by weight, preferably 25–45% by weight, and
  Component [D]: 5–20% by weight, preferably 10–20% by weight.

Component [C] is preferably selected from (i) the polyester resin or alkyd resin having an acid value of 2–20, a hydroxyl value of 70–300, and a number-average molecular weight of 300–6000, and/or (ii) the polyester resin or alkyd resin partially co-condensed with a melamine resin and having an acid value of 2–20, a hydroxyl value of 70–300, and a number-average molecular weight of 800–8000.

In a preferred embodiment, the acrylic resin C having an acid value of 10–50, a hydroxyl value of 60–180, and a number-average molecular weight of 1000–10000, and/or the polyester resin modified with a hydroxyl group-containing urethane may be further added as additional components [C].

As a catalyst, the acid catalyst or the esterification catalyst may be used.

The coating composition consisting essentially of the above components is excellent in the dispersibility of pigments and can provide a coated layer having excellent acid resistance.

(4) Fluorine-containing coating composition
  Component [A]: 10–60% by weight, preferably 10–30% by weight,
  Component [B]: 10–50% by weight, preferably 20–40% by weight,
  Component [C]: 10–45% by weight, preferably 25–45% by weight, and
  Component [D]: 5–20% by weight, preferably 10–20% by weight.

Component [C] is preferably a fluorine-containing copolymer resin having an acid value of 5–35, and a hydroxyl value of 60–180.

In a preferred embodiment, two or more of (i) the acrylic resin C having an acid value of 10–50, a hydroxyl value of 60–180, and a number-average molecular weight of 1000–10000, (ii) the polyester resin modified with a hydroxyl group-containing urethane, (iii) the polyester resin or alkyd resin having an acid value of 2–20, a hydroxyl value of 70–300, and a number-average molecular weight of 300–6000, and (iv) the polyester resin or alkyd resin partially co-condensed with a melamine resin and having an acid value of 2–20, a hydroxyl value of 70–200, and a number-average molecular weight of 800–8000 may be added as additional components [C].

As a catalyst, the acid catalyst or the esterification catalyst may be used.

The curing system of the present invention is believed to be as follows: The ring-opened, i.e., half-esterified acid anhydride groups are ring-closed at a curing temperature to reproduce acid anhydride groups which are reacted with the hydroxyl groups in the resin B. The reaction between the reproduced acid anhydride groups and the hydroxyl groups releases carboxyl groups which are then reacted with the epoxy groups in the resin B. In this system, the curing reaction would proceed through the two functional groups of acrylic resin A (i.e., hydroxyl groups and epoxy groups) to form a strongly bonded network which provides good weather resistance and chemical resistance.

The coating composition consisting essentially of the above components can provide a coated layer having excellent acid resistance, water repulsion properties, weathering resistance, etc.

Incidentally, the coating composition of the present invention may be dissolved or dispersed in various solvents (e.g., organic solvents, etc.) or dispersants depending on its application. The coating composition diluted by a solvent in a desired concentration is applied to a substrate to form a coating film thereon. As a result, a coated article comprising a coated layer produced from the coating composition of the present invention can be obtained.

The film thickness, coating equipment and other coating conditions for the above applications of the coating composition of the present invention may be the same as those for conventional automotive finish-coatings. If the coating composition of the present invention is used for a topcoat itself or a clear coat on the topcoat, the use of air spraying or electrostatic coating is advantageous.

the present invention will be explained in further detain by the following Examples.

SYNTHESIS EXAMPLE 1

Synthesis of Resin Containing Epoxy Groups and Hydroxyl Groups 450 parts by weight of xylene and 50 parts by weight of n-butanol are introduced into a 2-liter reactor equipped with a thermometer, a stirrer, a condenser, a pipe for introducing a nitrogen gas, and a funnel for dropping starting materials, and heated to 125° C.

Introduced into the reactor through the funnel over 3 hours are 220 parts by weight of a styrene monomer, 320 parts by weight of glycidyl methacrylate, 220 parts by weight of 2-hydroxyethyl methacrylate, 240 parts by weight of 2-ethylhexyl acrylate, and 40 parts by weight of t-butylperoxy-2-ethylhexanoate. After the completion of the dropping, the reactor is kept at 125° C. for 30 minutes, and then 10 parts by weight of t-butylperoxy-2-ethylhexanoate and 250 parts by weight of xylene are dropped into the reactor over 30 minutes.

After the completion of the dropping, reaction is further continued at 125° C. for 2 hours to obtain a resin varnish (A-1) containing hydroxyl groups and epoxy groups. The resin varnish (A-1) has an epoxy equivalent of 444, a non-volatile content of 59%, a hydroxy equivalent of 590, and a number-average molecular weight of 7000.

SYNTHESIS EXAMPLE 2

Synthesis of Resin Containing Epoxy Groups and Hydroxyl Groups

In the same manner as in Synthesis Example 1 except for using components shown in Table 1, a resin varnish (A-2) containing hydroxyl groups and epoxy groups is prepared. The resin varnish (A-2) has an epoxy equivalent of 444, a hydroxy equivalent of 590, and a number-average molecular weight of 4000.

TABLE 1

| Composition | Parts By Weight |
|---|---|
| Xylene[1] | 450 |
| n-Butanol[2] | 50 |
| Styrene Monomer | 30 |
| Glycidyl Methacrylate | 400 |
| 2-Hydroxyethyl Acrylate | 440 |
| 2-Ethylhexyl Acrylate | 130 |
| t-Butyl Peroxyethyl-2-Hexanoate | 80 |

TABLE 1-continued

| Composition | Parts By Weight |
|---|---|
| Xylene[3] | 250 |

Note
[1]: Introduced into the reactor in advance.
[2]: Solvent.
[3]: Introduced into the reactor during the reaction.

SYNTHESIS EXAMPLE 3

Synthesis of Polymer Containing Carboxylic Anhydride Groups (b-1)

80 parts by weight of xylene is introduced into a 1-liter reactor equipped with a thermometer, a stirrer, a condenser, a pipe for introducing a nitrogen gas, and a funnel for dropping starting materials, and heated to 115° C.

Introduced into the reactor through the funnel over 3 hours are 25 parts by weight of a styrene monomer, 21 parts by weight of n-butyl acrylate, 95 parts by weight of n-butyl methacrylate, 34 parts by weight of 2-ethylhexyl methacrylate, 50 parts by weight of itaconic anhydride, 100 parts by weight of propylene glycol monomethyl ether acetate, and 10 parts by weight of t-butylperoxy-2-ethylhexanoate. After the completion of the dropping, reaction was further continued for 2 hours to obtain a resin varnish (b-1) containing carboxylic anhydride groups. The resin varnish (b-1) had a non-volatile content of 53% and a number-average molecular weight of 5500.

SYNTHESIS EXAMPLE 4

Synthesis of Polymer Containing Carboxylic Anhydride Groups (b-2)

In the same manner as in Synthesis Example 3, a resin varnish (b-2) containing carboxylic anhydride groups is obtained from the components shown in Table 2. The resulting resin varnish (b-2) has a non-volatile content of 52% and a number-average molecular weight of 7000.

TABLE 2

| Composition | Parts By Weight |
|---|---|
| Solvesso 100[1] | 100 |
| Styrene Monomer | 30 |
| 2-Ethylhexyl Acrylate | 65 |
| 2-Ethylhexyl methacrylate | 45 |
| Butyl Acrylate | 15 |
| Maleic Anhydride | 45 |
| propylene Glycol Monomethyl Ether Acetate | 90 |
| t-Butyl Peroxyethyl-2-Hexanoate | 7 |

Note[1]: Aromatic hydrocarbon solvent manufactured by Exxon Chemical K. K.

SYNTHESIS EXAMPLE 5

Synthesis of Half-esterified Resin (B-1)

385 parts by weight of the resin (b-1) prepared in Synthesis Example 3 is reacted with 1.4 parts by weight of triethylamine in 35 parts by weight of butyl acetate, and 30 parts by weight of propargyl alcohol at 40° C. for 2 hours, to prepare a half-esterified resin (B-1). By infrared absorption measurement, it is confirmed that in the half-esterified resin (B-1), there is no absorption at 1785 cm$^{-1}$ (corresponding to an acid anhydride group) at all.

SYNTHESIS EXAMPLES 6 AND 7

Synthesis of Half-esterified Resins (B-2, B-3)

In the same manner as in Synthesis Example 5, half-esterified resins (B-2, B-3) are obtained from the components shown in Table 3. In an IR measurement, the half-esterified resins (B-2, B-3) do not show an absorption at 1785 cm$^{-1}$ (corresponding to an acid anhydride group) at all.

TABLE 3

| Resin | B-1 | B-2 | B-3 |
|---|---|---|---|
| Resin to Be Modified | Resin b-1 | Resin b-2 | Resin b-3 |
| Amount[1] | 385 | 385 | 372 |
| Modifier | Propargyl Alcohol | Acetol | Acetol |
| Amount[1] | 30 | 36 | 37 |
| Triethylamine Catalyst[1] | 1.4 | 1.4 | 1.0 |

Note[1]: Parts by weight.

EXAMPLES 1–11, COMPARATIVE EXAMPLES 1–3

A dull steel plate having a thickness of 0.8 mm treated with a zinc phosphate chemical is subjected to electrodeposition coating using a cationic electrodeposition paint [POWERTOP U-50, manufactured by Nippon Paint Co., Ltd.] at a dry thickness of about 25 μm.

Next, the resulting electrodeposition coated layer is coated with an intermediate coating paint [ORGA P-41 SEALER, manufactured by Nippon Paint Co., Ltd.] at a dry thickness of about 40 μm by an air-spraying method and baked at 140° C. for 30 minutes. Thereafter, an acrylic resin basecoat paint [SUPERLUCK, manufactured by Nippon Paint Co. Ltd.] is applied at a dry thickness of about 20 μm, and subjected to setting for 3 minutes. Next, each coating composition containing solid components shown in Table 4 (Examples) and Table 5 (Comparative Examples) is adjusted so that it has a viscosity of 25 seconds by FORDCUP #4, and applied at a dry thickness of about 40 μm under spraying pressure of 5 kg/cm$^2$ by means of an electrostatic applicator (AUTO REA, manufactured by Ransberg Gemma). After setting for 7 minutes, it is baked at 140° C. for 30 minutes.

Incidentally, each resin in Tables 4 and 5 is as follows:

C-1: Copolymer of lauryl methacrylate, n-butyl methacrylate, ethylhexyl methacrylate, methacrylic acid, hydroxyethyl methacrylate, and styrene, and having a number-average molecular weight of 7000, a hydroxyl value of 140 and an acid value of 15.

C-2: Copolymer of ethyl acrylate, ethylhexyl methacrylate, lauryl methacrylate, hydroxyethyl methacrylate, methacrylic acid and styrene, and having a number-average molecular weight of 3500, a hydroxyl value of 95 and an acid value of 15.

C-3: Lumiflon 916 manufactured by Asahi Glass Co., Ltd.

C-4: Reaction product of hexamethylene diisocyanate, trimethylol propane, and adipic acid.

C-5: Reaction product of xylylene diisocyanate, trimethylol propane, and sebacic acid.

C-6: Resin varnish (alkyd resin) prepared by a condensation reaction of polyvalent alcohols consisting of trimethylolethane and neopentyl glycol, and polybasic acids consisting of phthalic acid and isophthalic acid (7/3) together with coconut oil, which has an acid value of 5, a hydroxyl value of 80 and a number-average molecular weight of 3400.

C-7: Resin varnish (polyester resin) prepared by a condensation reaction of polyvalent alcohols consisting of neopentyl glycol, trimethylolethane and a hydroxypivalic acid/neopentyl glycol ester, and polybasic acids consisting of hexahydrophthalic acid and isophthalic acid (6/4), which has an acid value of 9, a hydroxyl value of 110 and a number-average molecular weight of 1500.

C-8: Resin varnish prepared by a co-condensation reaction of C-6 (alkyd resin) and U-Van128 (manufactured by Mitsui Toatsu Chemicals, Inc.) in a ratio of 100/5 on a solid basis, which has an acid value of 5, a hydroxyl value of 80 and a number-average molecular weight of 4000.

D-1: High-alkyl ether content type (methyl/butyl-mixed type) melamine resin (CYMEL 267, manufactured by Mitsui Cyanamide Co., Ltd.).

D-2: Butylated melamine resin (U-Van128, manufactured by Mitsui Toatsu Chemicals, Inc.).

E-1: Dodecylbenzenesulfonic acid.

E-2: Tetrabutyl ammonium bromide.

F-1: Surfactant (Modaflow, manufactured by Monsanto).

F-2: Ultraviolet absorber (TINUVIN 900 manufactured by Chiba Gaigy).

F-3: Photostabilizer (SANOL 292, manufactured by Sankyo Co., Ltd.).

TABLE 4

| Component* | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Component [A] | | | | | | | | | | | |
| A-1 | 23 | 23 | 23 | — | 25 | 23 | 30 | 23 | — | — | — |
| A-2 | — | — | — | 23 | 25 | — | — | — | 15 | 30 | 23 |
| Component [B] | | | | | | | | | | | |
| B-1 | 27 | 27 | — | — | — | 27 | 40 | — | 10 | — | — |
| B-2 | — | — | 27 | — | 30 | — | — | 27 | 10 | — | — |
| B-3 | — | — | — | 27 | — | — | — | — | — | 40 | 27 |
| Component [C] | | | | | | | | | | | |
| Type | C-1 | C-1/C-5 | C-1 | C-1 | C-1 | C-3 | C-4 | C-6 | C-7/C-8 | C-8 | C-2 |
| Amount | 35 | 20/15 | 35 | 35 | 10 | 35 | 20 | 35 | 15/35 | 20 | 30 |
| Component [D] | | | | | | | | | | | |
| D-1 | 15 | 15 | 15 | 15 | 10 | 15 | 10 | — | — | — | 20 |
| D-2 | — | — | — | — | — | — | — | 15 | 15 | 10 | — |
| Catalyst | | | | | | | | | | | |
| E-1 | 1.5 | 1.5 | 1.5 | 1.5 | 1.5 | 1.5 | 1.0 | — | — | — | 1.5 |
| E-2 | 0.1 | 0.1 | 0.1 | 0.1 | 0.1 | 0.1 | 0.1 | 0.1 | 0.1 | 0.1 | 0.1 |
| Additive | | | | | | | | | | | |
| F-1 | 1 | 1 | 1 | 1 | 1 | 1 | 1 | 1 | 1 | 1 | 1 |

TABLE 4-continued

| Component* | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| F-2 | 2 | 2 | 2 | 2 | 2 | 2 | 2 | — | — | — | 2 |
| F-3 | 1 | 1 | 1 | 1 | 1 | 1 | 1 | — | — | — | 1 |
| Pigment[1] | — | — | — | — | — | — | — | 70 | 70 | 70 | — |

Note[1]: Titanium dioxide.
Note*: Amount of each component is expressed by parts by weight.

TABLE 5

| Component | Comparative Example No. | | |
|---|---|---|---|
| | 1 | 2 | 3 |
| Component [A] | | | |
| A-1 | — | — | — |
| A-2 | — | — | — |
| Component [B] | | | |
| B-1 | — | — | — |
| B-2 | — | — | — |
| B-3 | — | — | — |
| Component [C] | | | |
| Type | C-1/C-4 | C-2 | C-6/C-8 |
| Amount | 65/10 | 65 | 35/35 |
| Component [D] | | | |
| D-1 | 25 | 35 | — |
| D-2 | — | — | 30 |
| Catalyst | | | |
| E-1 | 1.5 | 1.5 | — |
| E-2 | 0.1 | 0.1 | 0.1 |
| Additive | | | |
| F-1 | 1 | 1 | 1 |
| F-2 | 2 | 2 | — |
| F-3 | 1 | 1 | — |
| Pigment[1] | — | — | 70 |

Note[1]: Titanium dioxide.

Each coating thus produced is evaluated with respect to film appearance, pencil hardness, acid resistance, scuff (mar) resistance and water resistance according to the following standards: The results are shown in Table 6.

Incidentally, in Examples 8–10 and Comparative Example 3, the intermediate coated layer (made of ORGA P-41 SEALER manufactured by Nippon Paint Co., Ltd.) is coated with a topcoat coating composition having a formulation shown in Tables 4 and 5 at a dry thickness of about 40 μm, and subjected to setting for 7 minutes and baked at 140° C. for 30 minutes.

(1) Film appearance

Each test piece produced by the above method is observed by the naked eye with respect to defects such as roughness, gloss, blistering, dent, uneven color, cracking, wrinkling, etc., and evaluated according to the following standards:
⊙: No defects.
X: There is at least one of the above defects.

(2) Pencil hardness

Measured according to JIS K5400 8, 4.2.

(3) Acid resistance

Each test piece is immersed in 1-% by weight sulfuric acid solution kept at 60° C. for 24 hours, and lifted from the sulfuric acid solution to measure a 60° C. gloss retention. The evaluation of acid resistance is conducted according to the following standards:
Gloss Retention
⊙: 90 or more.
○: 70 or more and less than 90.
△: 40 or more and less than 70.
X: less than 40.

(4) Scuff (mar) resistance

About 1 cm³ of cleanser (manufactured by Kaneyo K. K.) is dropped onto two plies of flannel, and the knit is fixed to a vibration head of a wear resistance tester. Under a load of 700 g, the vibration head is moved reciprocally 10 times. Thereafter, the 20° gloss of a tested portion of the flannel is measured to determine the gloss retention. The evaluation of scuff (mar) resistance is conducted according to the same standards as in (3) above.

(5) Water resistance

Each test piece is immersed in tapped water at 40° C. for 10 days, and the coating of the test piece is observed by the naked eye and evaluated according to the following standards.
○: No defects.
X: There is at least one of the above defects.

TABLE 6

| No. | Film Appearance | Pencil Hardness | Acid Resistance | Scuff (mar) resistance | Water Resistance |
|---|---|---|---|---|---|
| Example | | | | | |
| 1 | ○ | H | ⊙ | ⊙ | ○ |
| 2 | ○ | H | ⊙ | ⊙ | ○ |
| 3 | ○ | H | ⊙ | ⊙ | ○ |
| 4 | ○ | H | ⊙ | ⊙ | ○ |
| 5 | ○ | H | ⊙ | ○ | ○ |
| 6 | ○ | H | ⊙ | ○ | ○ |
| 7 | ○ | H | ⊙ | ○ | ○ |
| 8 | ○ | H | ⊙ | ○ | ○ |
| 9 | ○ | H | ⊙ | ○ | ○ |
| 10 | ○ | H | ⊙ | ○ | ○ |
| 11 | ○ | H | ⊙ | ○ | ○ |
| Comparative Example | | | | | |
| 1 | ○ | H | X | ⊙ | ○ |
| 2 | ○ | H | X | ○ | ○ |
| 3 | ○ | H | X | △ | ○ |

As described above in detail, the coated layer obtained by using the thermosetting coating composition of the present invention has good scuff (mar) resistance, acid resistance, film appearance, weathering resistance, etc. together with good hardness and water resistance. The thermosetting coating composition of the present invention is suitable for topcoats for automobiles, buildings, outdoor constructions, etc.

What is claimed is:

1. A thermosetting coating composition consisting essentially of:

(a) an acrylic resin having hydroxyl groups and epoxy groups in a molecule thereof;

(b) a resin prepared from a monomer having an unsaturated group and an acid anhydride group, the acid anhydride group being half-esterified, half-thioesterified, and/or half-amidized;

(c) a hydroxyl group-containing resin selected from the group consisting of an acrylic resin containing hydroxyl groups and carboxyl groups, a fluorine and hydroxyl group-containing copolymer resin, a hydroxyl group-containing polyester resin and a mixture thereof; and (d) a melamine resin.

2. The thermosetting coating composition according to claim 1, wherein said resin (b), whose acid anhydride groups are half-esterified, half-thioesterified and/or half-amidized, has a number-average molecular weight of 500–40000.

3. The thermosetting coating composition according to claim 2, wherein the number-average molecular weight of said resin (b) is 1000–20000.

4. The thermosetting coating composition according to claim 2, wherein the number-average molecular weight of said resin (b) is 5000–10000.

5. The thermosetting coating composition according to claim 1, wherein the acid anhydride groups of said resin (b) are half-esterified.

6. The thermosetting coating composition according to claim 1, wherein the acid anhydride groups of said resin (b) are half-thioesterified.

7. The thermosetting coating composition according to claim 1, wherein the acid anhydride groups of said resin (b) are half-amidized.

8. The thermosetting coating composition according to claim 1, wherein said resin (b) has 2–5 acid anhydride groups.

9. The thermosetting coating composition according to claim 1, wherein said resin (c) is the acrylic resin containing hydroxyl groups and carboxyl groups.

10. The thermosetting coating composition according to claim 1, wherein said resin (c) is the fluorine-containing copolymer resin.

11. The thermosetting coating composition according to claim 1, wherein said resin (c) is the polyester resin.

12. The thermosetting coating composition according to claim 1, wherein said resin (b) is half-esterified by a half-esterification agent consisting of an alcohol having 1–4 carbon atoms.

13. The thermosetting coating composition according to claim 1, wherein said resin (b) is half-thioesterified by a half-thioesterification agent consisting of mercaptan.

14. The thermosetting coating composition according to claim 1, wherein said resin (b) is half-amidized by a half-amidization agent consisting of an amine.

15. The thermosetting coating composition according to claim 1, wherein said acrylic resin having hydroxyl groups and epoxy groups in a molecule thereof has an epoxy equivalent of 100–800, and a hydroxy equivalent of 200–1200.

16. The thermosetting coating composition according to claim 15, wherein said acrylic resin having hydroxyl groups and epoxy groups in a molecule thereof has an epoxy equivalent of 200–600, and a hydroxy equivalent of 400–1000.

17. The thermosetting coating composition according to claim 15, wherein said acrylic resin having hydroxyl groups and epoxy groups in a molecule thereof has an epoxy equivalent of 250–500, and a hydroxy equivalent of 500–800.

18. The thermosetting coating composition according to claim 1, wherein said acrylic resin (a) is a high-molecular weight resin produced from (i) 30–70% by weight of a radically polymerizable acrylic monomer containing an epoxy group, (ii) 10–50% by weight of a radically polymerizable acrylic monomer containing a hydroxyl group, and (iii) a remaining amount of another radically polymerizable monomer selected from styrene, methylstyrene, acrylates, methacrylates, acrylamide or methacrylamide.

19. The thermosetting coating composition according to claim 1, wherein said resin (b) is a copolymer of a monomer containing an unsaturated group and an acid anhydride group and another copolymerizable monomer, the acid anhydride group being half-esterified, half-thioesterified, and/or half-amidized.

20. The thermosetting coating composition according to claim 19, wherein the half-esterification of said copolymer (b) is conducted in the presence of a low-molecular weight alcohol.

21. The thermosetting coating composition according to claim 19, wherein the half-thioesterification of said copolymer (b) is conducted in the presence of a low-molecular weight mercaptan.

22. The thermosetting coating composition according to claim 19, wherein the half-amidization of said copolymer (b) is conducted in the presence of a low-molecular weight amine.

23. The thermosetting coating composition according to claim 9, wherein said resin (c) is an acrylic resin containing hydroxyl groups and carboxyl groups, which is produced from (1) an acrylic monomer containing a hydroxyl group, (2) an ethylenic monomer containing a carboxyl group, (3) an acrylic monomer copolymerizable with said monomers (1) and (2), and (4) a styrene monomer selected from the group consisting of styrene and styrene derivatives.

24. The thermosetting coating composition according to claim 23, wherein said resin (c) is an acrylic resin further containing a cross-linkable monomer having 2 or more radically polymerizable unsaturated groups.

25. The thermosetting coating composition according to claim 10, wherein said resin (c) is a fluorine and hydroxyl group-containing copolymer resin having a composition of a fluorine-containing vinyl monomer, a linear alkyl vinyl monomer, a cycloalkyl vinyl monomer, a hydroxyalkyl vinyl monomer, and a carboxyl group-containing monomer.

26. The thermosetting coating composition according to claim 10, wherein said resin (c) is a fluorine and hydroxyl group-containing copolymer resin consisting essentially of a flouroolefin, a vinyl carboxylate, a hydroxyalkyl vinyl ether, and an alkyl vinyl ether.

27. The thermosetting coating composition according to claim 10, wherein said resin (c) is a fluorinated acrylic resin constituted by an acrylic resin and a fluoroolefin.

28. The thermosetting coating composition according to claim 1, wherein said resin (c) is a polyester resin modified with a hydroxyl group-containing urethane.

29. The thermosetting coating composition according to claim 1, wherein said polyester resin (c) is an alkyd resin.

30. The thermosetting coating composition according to claim 1, wherein said resin (c) is a polyester resin or an alkyd resin, which is partially co-condensed with a melamine resin.

31. The thermosetting coating composition according to claim 1, further containing a catalyst selected from the group consisting of an acid catalyst and an esterification catalyst.

32. The thermosetting coating composition according to claim 18, wherein said (i) radically polymerizable acrylic monomer containing an epoxy group is selected from glycidyl acrylate, glycidyl methacrylate or 3,4-epoxycyclohexanyl methyl methacrylate.

33. The thermosetting coating composition according to claim 1, wherein compound (b) is a half-thioesterified resin or a half-amidized resin.

34. The thermosetting coating composition according to claim 1, wherein compound (c) is a fluorine and hydroxyl group-containing copolymer resin.

35. The thermosetting coating composition according to claim 1, wherein compound (b) is a half-thioesterified resin or a half-amidized resin and compound (c) is a fluorine and hydroxyl group-containing copolymer resin.

36. The thermosetting coating composition according to claim 18, wherein compound (b) is a half-thioesterified resin or a half-amidized resin.

37. The thermosetting coating composition according to claim 18, wherein compound (c) is a fluorine and hydroxyl group-containing copolymer resin.

38. The thermosetting coating composition according to claim 18, wherein compound (b) is a half-thioesterified resin or a half-amidized resin and compound (c) is a fluorine and hydroxyl group-containing copolymer resin.

* * * * *